United States Patent [19]

Donatelli et al.

[11] Patent Number: 4,495,326

[45] Date of Patent: Jan. 22, 1985

[54] RUBBER COMPOUNDS CONTAINING ZINC DIMETHACRYLATE

[75] Inventors: Thomas F. Donatelli; Philip F. Murray, both of Akron, Ohio

[73] Assignee: The Firestone Tire & Rubber Company, Akron, Ohio

[21] Appl. No.: 569,418

[22] Filed: Jan. 9, 1984

[51] Int. Cl.$^3$ .................... C08K 3/04; C08L 51/00; C08L 31/00

[52] U.S. Cl. ................... 524/533; 524/496; 524/534

[58] Field of Search .............. 524/533, 534, 496

[56] References Cited

U.S. PATENT DOCUMENTS 3,823,122 7/1974 Schutt et al. ................... 524/397
4,082,288 4/1978 Martin ........................... 260/998.14
4,191,671 3/1980 Kataoka et al. ................. 260/23.7
4,192,790 3/1980 McKinstry et al. ............. 524/397

FOREIGN PATENT DOCUMENTS 1091818 11/1967 United Kingdom .
2042553 9/1980 United Kingdom .

OTHER PUBLICATIONS

Derwent Abstract 51465 E/25, Sumitomo Rubber, J57078875, (5-1982).
Derwent Abstract 51372 E/25, Sumitomo Rubber J57078432, (5-1982).

Primary Examiner—Herbert J. Lilling
Attorney, Agent, or Firm—Frank J. Troy, Sr.

[57] ABSTRACT

Sulfur-curable, carbon black reinforced material rubber compounds having improved processing properties in the uncured state and improved strength and dynamic properties in the cured state are obtained by the addition of from about 0.2 to about 15 parts by weight per 100 parts by weight of natural rubber of a zinc dimethacrylate having a surface area of from about 3.7 to about 5.4 m$^2$/g or more to the compounds. The addition of the zinc dimethacrylate to the compounds permits the use of lower quantities of carbon black than would ordinarily be employed in the absence of the zinc dimethacrylate while still providing for the improved properties.

5 Claims, No Drawings

RUBBER COMPOUNDS CONTAINING ZINC DIMETHACRYLATE

BACKGROUND OF THE INVENTION

The invention relates to sulfur-curable, carbon black reinforced natural rubber compounds containing zinc dimethacrylate. More particularly, the invention relates to sulfur-curable, carbon black reinforced natural rubber compounds in which the cured and uncured properties are improved by the addition thereto of small amounts of a zinc dimethacrylate having a specified surface area.

U.S. Pat. No. 4,191,671 relates to abrasion resistant rubber compositions containing diene elastomers such as natural rubber, homopolymers of conjugated dienes and copolymers of conjugated dienes and vinyl aromatic hydrocarbons; an $\alpha,\beta$-ethylenically unsaturated carboxylic acid such as acrylic and methacrylic acid; a divalent metal compound such as zinc, magnesium, calcium or cobalt compound and an organic peroxide. The patent discloses that the rubber composition may also contain an unpolymerizable carboxylic acid (i.e., a saturated acid), an amine compound, carbon black and conventional fillers such as silicas, silicates and quinone dioximes.

U.S. Pat. No. 4,192,790 relates to filled elastomeric compositions having reduced viscosity in the compounded state which contain natural rubber or various synthetic polymers; an inorganic particulate filler such as a silica, a silicate or calcium carbonate and a metal salt of a monoethylenically unsaturated carboxylic acid, especially particulate, finely divided basic zinc methacrylate. The patent states that other methacrylate salts of interest include neutral (normal) zinc salt, sodium salt, basic salt of calcium, magnesium, lead, etc. The patent additionally discloses that the compositions may optionally contain compounding ingredients such as carbon black, zinc oxide, calcium stearate, peroxide curing systems or sulfur curing systems.

British Pat. No. 2,042,533 relates to crosslinked cellular elastomers comprising the reaction product of a natural rubber and/or one or more synthetic rubbers, a cross-linking agent and a monomeric metallic salt of an ethylenically-unsaturated carboxylic acid. The only cross-linking agents specifically disclosed in the reference are peroxides. Monomeric metallic salts which are disclosed include zinc dimethacrylate, zinc diacrylate, a mixture of these two or basic zinc methacrylate with basic zinc methacrylate being preferred due to its greater reproducibility. The reference further indicates that the composition may further contain other additives including fillers such as carbon black or titanium dioxide, cross-linking rate controlling agents, antioxidants and processing aids.

SUMMARY OF THE INVENTION

In accordance with the present invention, sulfur-curable, carbon black reinforced, natural rubber compounds having improved processing properties in the uncured state and improved strength and dynamic properties in the cured state have been discovered. The compounds comprise 100 parts by weight of natural rubber, from about 20 to 120 parts by weight of carbon black, from about 1 to about 15 parts by weight of a zinc dimethacrylate having a surface area of from about 3.7 to about 5.4 $m^2/g$ or more.

The addition of the zinc dimethacrylate to the compounds has been found to permit the use of less carbon black than is ordinarily employed in conventional natural rubber compounds. The compounds of the invention in the cured state exhibit higher rebound values, lower hysteresis properties and longer blow-out times than do conventional natural rubber formulations in the cured state. In addition, the compounds of the invention generally exhibit higher modulus, higher tensile strength and higher energy to break compared to compounds of the same formulation (i.e., equal carbon black and sulfur levels) without the zinc dimethacrylate.

The natural rubber compounds of this invention may be utilized in various applications where curable natural rubber compounds have heretofore been employed and are particularly suitable for use in tires.

DETAILED DESCRIPTION OF THE INVENTION

As indicated above, the sulfur-curable natural rubber compounds of the invention contain carbon black, sulfur and a zinc dimethacrylate powder having a relatively high surface area.

The compounds may contain from about 20 to about 120, preferably from 30 to 90, parts by weight of carbon black per 100 parts by weight of natural rubber; from about 1 to about 15, preferably from 2 to 10, parts by weight of sulfur per 100 parts by weight of natural rubber and from about 0.2 to about 15, preferably from 0.5 to 10, parts by weight of a zinc dimethacrylate having a surface area of from about 3.7 to about 5.4 $m^2/g$.

A zinc dimethacrylate having the required surface area can be produced by the method set forth in copending U.S. Application Ser. No. 543,705, filed in the names of Robert A. Hayes and Wendell R. Conard, commonly assigned to Applicants assignee herein, the disclosure of which is incorporated herein by reference. A preferred zinc dimethacrylate for use in the compounds of the present invention is one having a surface area of 4.5 $m^2/g$. The preferred zinc dimethacrylate and its method of production is described in Example 3 of the aforementioned incorporated copending application.

In addition to the required ingredients, the sulfur-curable natural rubber compounds of the invention may contain various other ingredients conventionally employed in natural rubber compounds utilized in the tire industry. Thus, the compounds may contain conventional cure accelerators, antioxidants, antiozonants, waxes and the like.

These sulfur-curable natural rubber compounds may be mixed using conventional rubber mixing equipment such as Banbury mixers, mills and the like, and cured using conventional curing equipment and cure cycles.

The following examples are submitted for the purpose of further illustrating the nature of the present invention and are not to be considered as a limitation on the scope thereof. Parts and percentages shown in the Examples are by weight unless otherwise indicated.

EXAMPLE 1

In this evaluation, a sulfur-curable natural rubber compound of the invention (Example 1) containing 20 percent less carbon black than is ordinarily employed in conventional natural rubber compounds was prepared. For comparative purposes, a conventional sulfur-curable natural rubber compound (Example A) and a sulfur-curable natural rubber compound having the same formulation as Example 1 except that it did not contain zinc dimethacrylate (Example B) were prepared. Compound formulations were as follows:

| Ingredients | Parts By Weight Example | | |
|---|---|---|---|
| | A | B | 1 |
| Natural Rubber | 100 | 100 | 100 |
| HAF Black | 50 | 40 | 40 |
| Zinc Oxide | 7.5 | 7.5 | 7.5 |
| Stearic Acid | .5 | .5 | .5 |
| Santoflex DD | 2 | 2 | 2 |
| Sulfur | 7.5 | 7.5 | 7.5 |
| N—oxydiethylene-2 benzothiazole-sulfenamide | .75 | .75 | .75 |
| Santoflex 13 | 1 | 1 | 1 |
| Zinc Dimethacrylate | 0 | 0 | 1 |
| | 169.25 | 159.25 | 160.25 |

The above formulations were prepared by mixing all the ingredients except for the curing agents and cure accelerators in a small Banbury mixer. The curing agents and curing accelerators were then incorporated in a final mix on a rubber mill. The mixed compounds were evaluated for viscosity and then cured and tested for running temperature, rebound and stress-strain properties. Test conditions and results are shown in Table I.

TABLE I

| | Example | | |
|---|---|---|---|
| | A 50 phr* Black 0 phr Zinc Dimethacrylate | B 40 phr Black 0 phr Zinc Dimethacrylate | 1 40 phr Black 1 phr Zinc Dimethacrylate |
| Mooney Viscosity at 212° F. | 74 | 60 | 61 |
| Ring Tensiles (cured 30 min. at 300° F.) | | | |
| 50% Modulus | 220 | 171 | 213 |
| 100% Modulus | 444 | 331 | 430 |

TABLE I-continued

| | Example | | |
|---|---|---|---|
| | A 50 phr* Black 0 phr Zinc Dimethacrylate | B 40 phr Black 0 phr Zinc Dimethacrylate | 1 40 phr Black 1 phr Zinc Dimethacrylate |
| 300% Modulus | 1912 | 1529 | 1848 |
| Ultimate Tensile Strength (psi) | 2359 | 2434 | 2760 |
| % Elongation | 354 | 410 | 401 |
| Energy to Break (psi) | 3474 | 4018 | 4626 |
| Steel Ball Rebound | | | |
| R.T. | 50 | 63 | 63 |
| 212° F. | 77 | 81 | 83 |
| Running Temperature (°F.) | | | |
| % Deflection | 14.7 | 16.7 | 13.3 |
| Running Temperature (°F.) | 215 | 182 | 191 |
| Blow Out Time (minutes) | | | |
| Shore A | 64 | 60 | 65 |
| % Deflection | 29.3 | 33.3 | 28.0 |
| Running Temperature (°F.) | 408 | 415 | 392 |
| Blow Out Time (min.) | 37 | 77 | 86 |

(*phr means part per 100 parts rubber)

I claim:

1. A sulfur-curable natural rubber compound comprising:
   (a) 100 parts by weight of natural rubber;
   (b) from about 20 to 120 parts by weight of carbon black;
   (c) from about 1 to about 15 parts by weight of sulfur; and
   (d) from about 0.2 to about 15 parts by weight of a zinc dimethacrylate powder having a surface area of from about 3.7 to about 5.4 m$^2$/g or more.

2. The sulfur-curable natural rubber compound of claim 1 wherein the zinc dimethacrylate has a surface area of 4.5 m$^2$/g.

3. The sulfur-curable natural rubber compound of claim 1 wherein said compound contains from 30 to 90 parts by weight of carbon black.

4. The sulfur-curable natural rubber compound of claim 1 wherein said compound contains from 2 to 10 parts by weight of sulfur.

5. The sulfur-curable natural rubber compound of claim 1 wherein said compound contains from 0.5 to 10 by weight of said zinc dimethacrylate.

* * * * *